H. CARPENTER.

Peach-Baskets.

No. 5,922. Reissued June 16, 1874.

Witnesses:

Chas. Raettig.
F. v. Briesen

Inventor:

H. Carpenter
by his attorney
A. v. Briesen

UNITED STATES PATENT OFFICE.

HENRY CARPENTER, OF WILLIAMSBURG, NEW YORK.

IMPROVEMENT IN PEACH-BASKETS.

Specification forming part of Letters Patent No. 83,459, dated October 27, 1868; antedated October 17, 1868; reissue No. 5,922, dated June 16, 1874; application filed April 22, 1874.

*To all whom it may concern:*

Be it known that I, HENRY CARPENTER, of Williamsburg, in the county of Kings and State of New York, have invented a new and Improved Fruit-Basket, of which the following is a specification:

This invention consists in a novel manner of securing the bottom in a basket, whereby the bottom is somewhat raised so that it cannot come in contact with the earth or any support on which the basket is placed. This result is obtained by having a hoop firmly secured within the lower end of the basket for the bottom to rest upon, said hoop being combined and connected with an outer hoop, which embraces the lower part of the basket, all as hereinafter more fully described.

Figure 1:
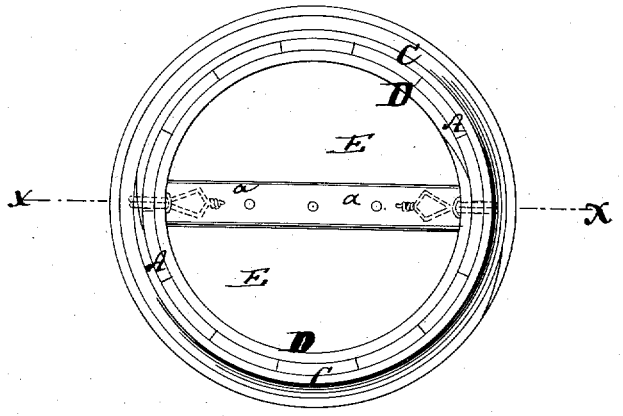
Figure 2:
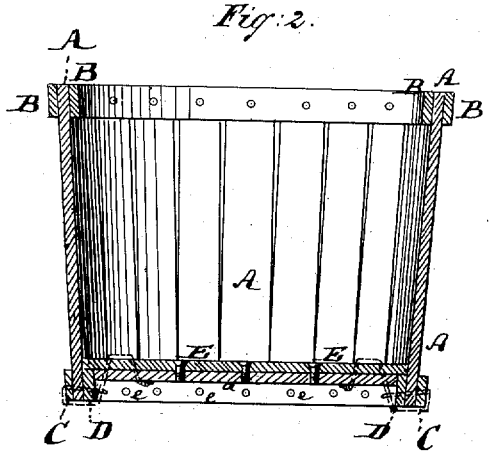

In the accompanying drawing, Figure 1 is an inverted plan of a fruit-basket provided with my improvement. Fig. 2 is a vertical section of the same taken on the line *x x*, Fig. 1.

Similar letters of reference indicate corresponding parts in both figures.

A represents the splints, which form the side of the basket; B B, the inner and outer top hoops; C, the exterior lower hoop, and D the interior lower hoop. All these hoops are firmly secured in position by nails, or otherwise, the small circles *e* in Fig. 2 indicating nails which extend from the outer hoop C through the splints A into the inner hoop D, or vice versa. E represents the bottom of the basket, which is made of good thin stuff, and rests upon the inner hoop D.

One way of securing the bottom E upon the inner hoop D is by means of the batten *a*, which is placed centrally beneath the bottom, and has its ends inserted in notches that are formed in the inner hoop D, the bottom being by screws or wires secured to such batten.

By this invention, the bottom of the basket is preserved from injury, and is not liable to be knocked into the basket, or broken or split by a sudden fall, as the bottom does not come in contact with the ground or the support on which the basket rests.

I do not claim, broadly, a fruit-basket provided with a raised or elevated bottom; but I do claim and desire to secure by Letters Patent—

In a fruit-basket, the combination of the outer hoop C, splints A, inner hoop D, and bottom E, the inner hoop D constituting a support for the bottom, substantially as described.

H. CARPENTER.

Witnesses:
A. V. BRIESEN,
E. C. WEBB.